Figure 1:
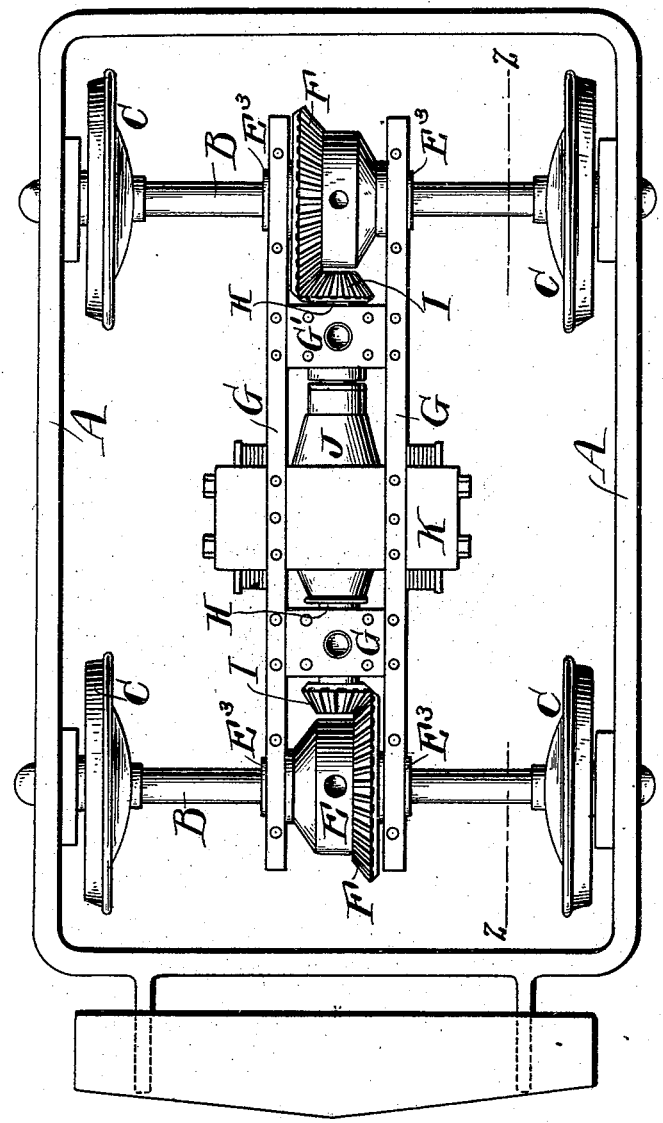

(No Model.) 2 Sheets—Sheet 1.

L. WARFIELD.
DEVICE FOR COMMUNICATING MOTION.

No. 494,182. Patented Mar. 28, 1893.

WITNESSES: INVENTOR:

(No Model.) 2 Sheets—Sheet 2.
L. WARFIELD.
DEVICE FOR COMMUNICATING MOTION.
No. 494,182. Patented Mar. 28, 1893.
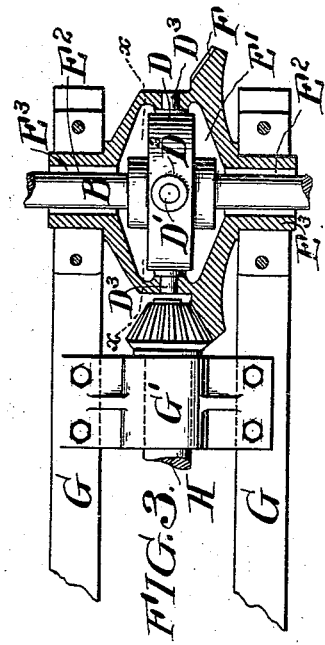
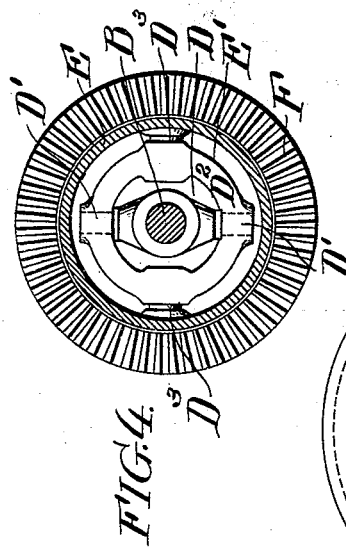
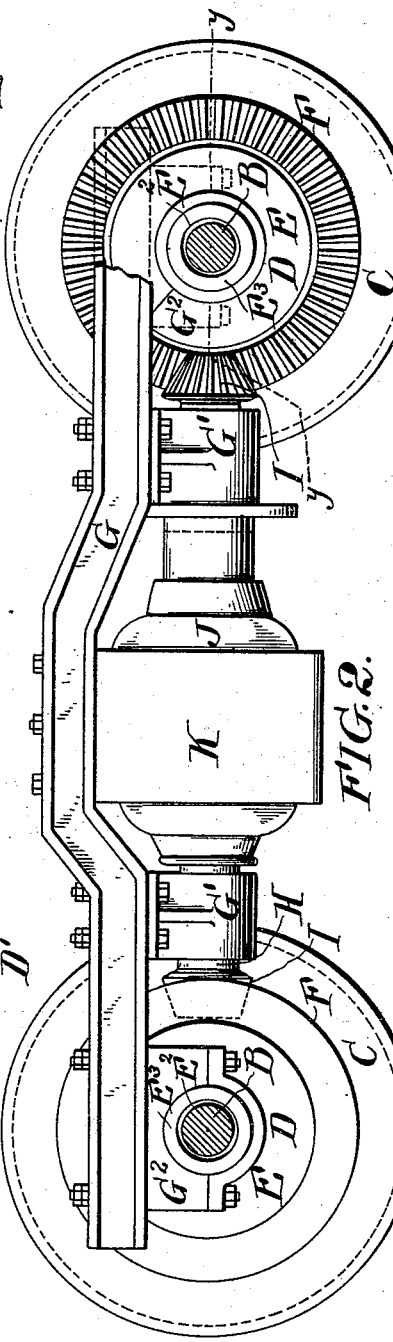
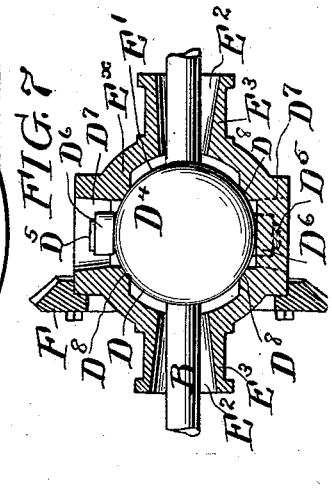
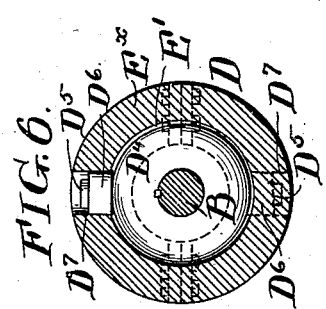
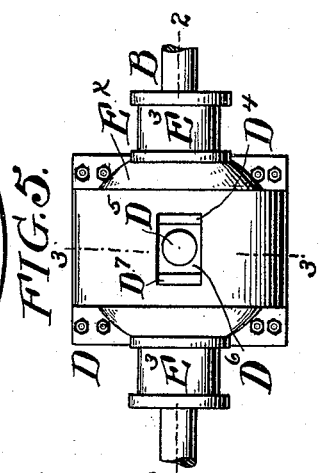
WITNESSES:
INVENTOR:
Louis Warfield
by his atty
Francis T. Chambers
THE NORRIS PETERS CO., PHOTO-LITHO., WASHINGTON, D. C.

UNITED STATES PATENT OFFICE.

LOUIS WARFIELD, OF DETROIT, MICHIGAN.

DEVICE FOR COMMUNICATING MOTION.

SPECIFICATION forming part of Letters Patent No. 494,182, dated March 28, 1893.

Application filed November 28, 1892. Serial No. 453,319. (No model.)

*To all whom it may concern:*

Be it known that I, LOUIS WARFIELD, of Detroit, county of Wayne, State of Michigan, have invented a certain new and useful Device for Communicating Motion, of which the following is a true and exact description, reference being had to the accompanying drawings, which form a part of this specification.

My invention relates to devices for communicating motion, and is especially, though not exclusively, adapted for communicating motion to or driving the axles of locomotives, cars, or carriages, particularly those which are actuated by motors carried upon the vehicle or its axles or trucks, and more especially still to those actuated by electric motors.

Generally speaking my invention may be said to consist in the combination of a shaft and a frame, with a wheel, drum, or casing surrounding the shaft and secured to it by means of a connection which will cause the casing and shaft to revolve together, while leaving the shaft free to change its angular position with respect to the casing, (any form of universal joint may be used for this purpose,) said wheel, drum, or casing being secured to the frame aforesaid by journals, so that the casing and frame will preserve a substantially uniform position with respect to each other; by this arrangement, the casing and shaft are adapted to drive one another, while having a certain freedom of angular motion, and the casing can be connected by positive gearing with mechanism supported on the frame.

Preferably the device is formed in the shape of a casing having hollow bearings or trunnions extending from it, through which the shaft passes. The casing is united to the shaft by a universal joint of any kind, and has secured upon its outside a driving wheel, which wheel is engaged or driven in any convenient way, as by a gear wheel secured on a frame connected in turn with the bearings or trunnions of the casing, and upon which framing the driving shaft or other driving mechanism, and preferably also the motor, is supported.

Reference being now had to the drawings which illustrate my invention,—Figure 1, is a plan view showing one way of applying my invention to the axles of a tramway car. Fig. 2, is an elevation on the line $z\ z$ of Fig. 1, drawn to a somewhat larger scale. Fig. 3, is a plan view taken partly in section on the line $y\ y$ of Fig. 2. Fig. 4, an elevation on the section line $x\ x$ of Fig. 3. Fig. 5, shows a modified construction of the casing and universal joint. Fig. 6, is a sectional elevation taken on the line 3—3 of Fig. 5; and—Fig. 7, a longitudinal sectional view taken on the line 1—2 of Fig. 5.

A indicates the truck frame of the car shown here of usual construction.

B B are the axles; C C, &c., the car wheels. E (Figs. 1 to 4 inclusive) indicates a casing; and $E^{\times}$ (Figs. 5 to 7 inclusive) a modified form of casing; the central cavity $E'$ of the casing contains a universal joint by which the casing is secured to the shaft B which passes into or through it, as shown on the drawings. Preferably the casing is provided with trunnions or bearings $E^3$ which are hollow, as indicated at $E^2$, the opening being considerably larger than the diameter of the shaft so as to permit the shaft to move freely for the desired distance.

The universal joint as a whole, indicated by the symbol D, consists in the design shown in Figs. 1 to 4, in oppositely extending bearing pins D D secured to the shaft B, a ring $D^2$ surrounding the shaft and pivoted on the pins D, and a pair of bearing pins $D^3\ D^3$ by which the ring $D^2$ and the casing E are pivotally connected along a line transverse to the line of the pins $D'\ D'$. This form of universal joint is familiarly known, and is only claimed by me in a new combination in which it is embodied.

In the modified construction indicated in Figs. 5 to 7, the universal joint is made up of a spherical bearing $D^4$ attached to the shaft or axle B and fitting in the cavity $E'$ of the casing E; contact faces $D^8$ being provided in any desired number and convenient arrangement. An elongated slot $D^7$, or preferably two such slots placed opposite to each other, are formed in the casing E, and in these slots is a slide block $D^6$ which is connected with the bearing $D^4$ by means of a pivot pin $D^5$. The universal joint thus formed between the shaft or axle casing is well adapted for such uses in connection with tramway cars in which a considerable weight is supported by the axles directly through the medium of the joint and casing, and this particular joint forms the subject matter of another application for Letters Patent filed by me August 4, 1891, Serial No. 401,693. These two joints it will be understood are shown by me simply as types of the class of joints I have mentioned.

F indicates a miter gear wheel formed with or secured to the casing; G, G, a framing secured to the trunnions or bearings $E^3$ of the casing or casings and carrying the bearings G' G' in which rests the driving shaft H, the shaft having on its end or ends miter wheels I in engagement with the wheel or wheels F of the casing or casings.

J in the drawings indicates the armature of an electric motor; K, the magnetic field of the motor, the said field being supported on the frame G, and the armature attached to the shaft H.

It will be seen that when the shaft H is rotated by the electric motor or any other device this engagement of its wheel I, with gear F, will cause the casing to rotate; and with the casing the shaft B which passes into or through it must also rotate by reason of their connection together. At the same time the shaft B is free to change its angular position with respect to the casing within the limit of clearance in trunnion $E^3$, which clearance may readily be made sufficient to permit all ordinary and desirable variations in the position of the axle or shaft, which is thus enabled to freely accommodate itself to the exigencies of use without in the least disarranging or straining the driving mechanism by which it is actuated.

The frame G may be steadied and wholly or partially supported by any convenient connection with the truck or car body and where joints of the kind shown are used the casing is to be formed in sections to permit of the insertion of the joint.

The line on which the casing will be sectioned may be varied considerably; in the form of casing indicated in Figs. 1 to 4, the section may with advantage be taken as shown in Fig. 3—that is to say, is on the line $y\ y$ of Fig. 2; and the line of the section in Fig. 5 is clearly indicated by the bolt flanges there represented. It will also be understood that the driving mechanism illustrated is shown simply as an efficient and simple embodiment of my invention, and that I do not limit myself to the use of any particular means for communicating motion from the motor to the wheel or drum on the casing, and obviously the power may be transmitted from the shaft to the casing and from it to the point of application.

Having now described my invention, what I claim as new, and desire to secure by Letters Patent, is—

1. The combination with a shaft of a casing surrounding the same, and having one or more bearings formed on or secured to it; means for uniting the casing and shaft, so that they will turn together while free to change their angular positions, and a frame secured to the casing bearing or bearings.

2. The combination with a shaft of a casing surrounding the same and having bearings through one or both of which the shaft extends; means for uniting the casing and shaft so that they will turn together while free to change their angular positions; a driving wheel secured to the casing; and a frame secured to the bearings.

3. The combination with a shaft of a casing surrounding the same and having bearings through one or both of which the shaft extends; means for uniting the casing and shaft so that they will turn together while free to change their angular positions; a driving wheel secured to the casing; a frame secured to the casing bearings, and power transmitting mechanism supported on said frame and operatively connected with the casing gear.

4. The combination, with a shaft B, of a casing having hollow journals through which said shaft extends; means for uniting the casing and shaft between the bearings so that they will turn together though free to change their angular positions; a frame G secured to the bearings of the casing; an electric motor supported on the frame, and means for driving the casing from the motor also supported on the frame.

5. The combination, with a carriage, of two axles B B, casings having hollow bearings secured to each axle by a universal joint as described; a frame G secured to the bearings of the two casings; a motor supported upon the frame; and means for driving the casings from the said motor also supported on the frame.

6. The combination, with a carriage, of two axles B B, casings having hollow journals secured to each axle by a universal joint as described; a frame G secured to the bearings of the two casings; a motor supported upon the frame; a longitudinal driving shaft H journaled in the frame G, and means for operatively connecting said shaft with the casings.

7. The combination, with a casing having hollow bearings, of a shaft passing through said bearings; bearing pins D' D' secured to the shaft and projecting on opposite sides thereof; an annulus $D^2$ journaled on said pins and pivotally connected with the casing by pins $D^3\ D^3$ arranged in a line transverse to the line of pins D' D'; a gear wheel secured to the casing, a frame supported on the casing bearings, and driving mechanism supported on the frame and in operative connection with the casing gearing.

LOUIS WARFIELD.

Witnesses:
JOSEPH McMILLAN,
JAS. H. McMILLAN.